Nov. 30, 1937.                R. KUSKIE                    2,100,965
                                PITMAN
                           Filed Nov. 9, 1936
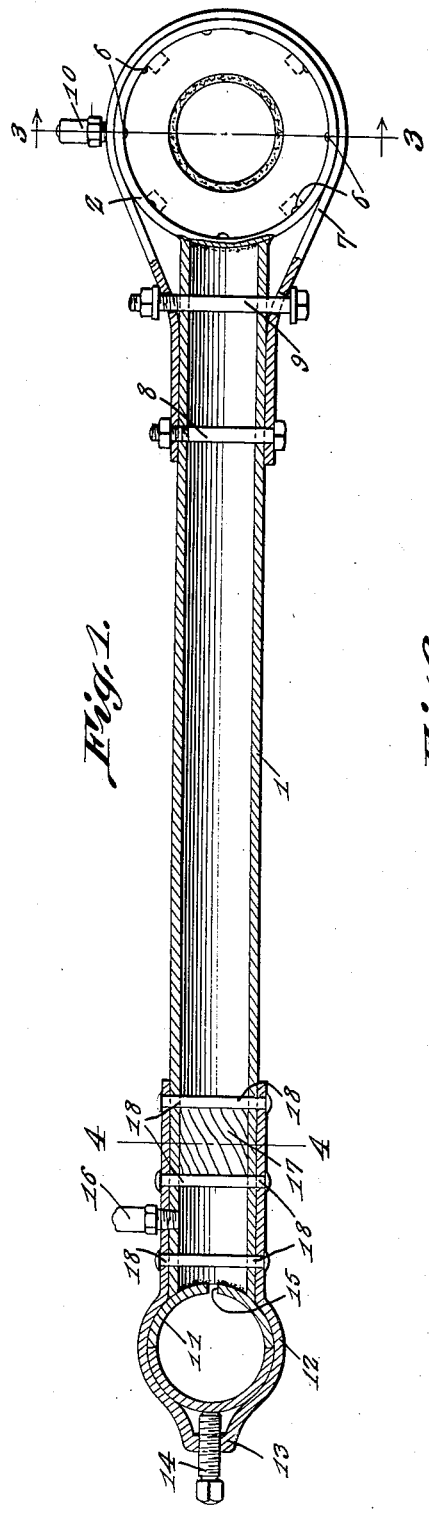
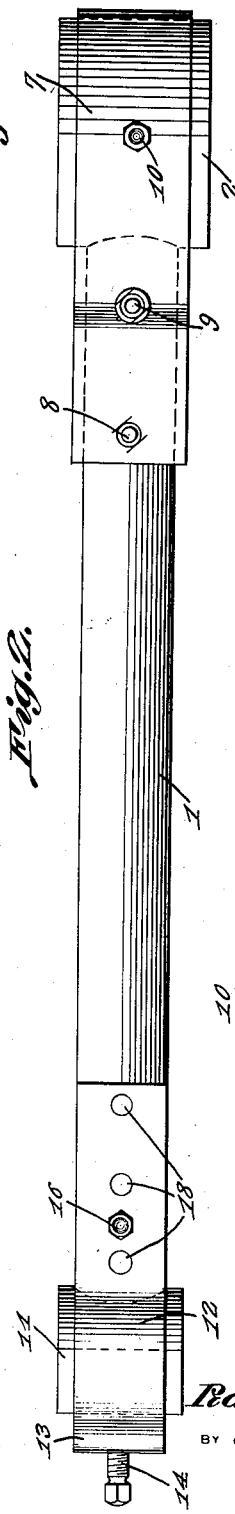
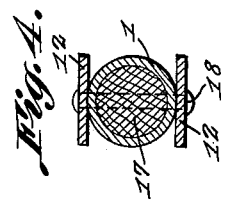
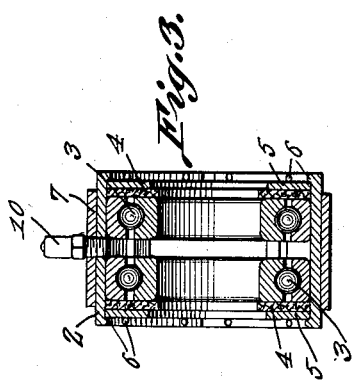
Ralph Kuskie, INVENTOR
BY Victor J. Evans & Co.
                                              ATTORNEYS Patented Nov. 30, 1937

2,100,965

UNITED STATES PATENT OFFICE 2,100,965

PITMAN

Ralph Kuskie, Grant, Nebr.

Application November 9, 1936, Serial No. 109,999

1 Claim. (Cl. 74—587)

This invention relates to pitmans for combines and has for the primary object the provision of an efficient and inexpensive device of metallic construction which will operate successfully with friction and wear reduced to a minimum and may be easily adjusted when wear occurs and will have a much longer life than pitmans now in use and of a partly fibrous construction.

With these and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a vertical sectional view illustrating a pitman constructed in accordance with my invention.

Figure 2 is a top plan view illustrating the device.

Figure 3 is a transverse sectional view taken on the line 3—3 of Figure 1.

Figure 4 is a transverse sectional view taken on the line 4—4 of Figure 1.

Referring in detail to the drawing, the numeral 1 indicates a metallic tubular member of a selected length having in engagement with one end a bearing supporting housing 2 also of tubular formation and in which are located ball bearings 3. The ball bearings are carried by races and the races are spaced a selected distance from each other and are engaged by felt washers 4 to prevent the escape of lubricant and the washers are held in contact with the races by split rings 5. The split rings are held in the housing 2 by spaced teats or projections 6 formed on said housing.

When desiring to remove the roller bearings the split rings can be easily disengaged from the housing to permit the ball bearings and their cages to be taken from the housing.

The housing 2 is surrounded by a strap 7 and the latter is connected to opposite sides of the member 1 by spaced bolts 8 and 9. The bolts extend entirely through the member 1 and the bolt 9 is located adjacent the housing whereby on adjustment of the nut thereon the strap may be caused to increase and decrease its grip upon the housing. Extending through the housing and the strap and having threaded connection with said housing is a lubricant fitting 10 whereby lubricant may be forced to the ball bearings. The ball bearings receive the usual pitman crank of a combine.

The opposite end of the member 1 is engaged by a bearing sleeve 11 composed of companion sections. A strap 12 supports the bearing sleeve 11 to said end of the member 1 and has an offset portion 13 carrying a set bolt 14 engageable with one of the sections of the bearing sleeve. The other section is provided with a lubricant opening 15 placing the sleeve in communication with the interior of the member 1 to receive therefrom lubricant furnished through a lubricant fitting 16. A block 17 is positioned in the member 1 for restricting the space in the latter to receive the lubricant from the fitting. The strap 12 is secured to the member 1 by rivets 18 which extend entirely through the member 11 and certain of said rivets act to retain the block 17 in proper position. The bearing sleeve fits on the sickle pin of the combine. When wear occurs in the bearing sleeve 11, the ends of the sections of said sleeve may be cut away and by adjusting the set bolt 14 the sections may then be caused to fit the sickle pin of the combine properly. The parts described in making up this pitman are metallic, therefore, increasing the life of the pitman over pitmans now in use and of partly fibrous construction. It is apparent from the construction disclosed that the pitman can be easily adjusted to compensate for wear and may be thoroughly lubricated to reduce wear to a minimum.

Having described the invention, I claim:

A pitman comprising a tubular member, a housing in engagement with one end of the member, a strap surrounding said housing, means for detachably and adjustably securing the strap on said member, ball bearings supported by said housing, a bearing sleeve engaging the other end of said member and including sections, a strap secured to the member and surrounding the sleeve to retain the latter in engagement with the member and the sections thereof assembled, a set bolt carried by the last-named strap to engage the sleeve, a lubricant fitting secured to said housing for furnishing lubricant to the ball bearings, felt washers located in said housing to prevent escape of the lubricant, split rings releasably secured in said housing and retaining the felt washers in position, a block secured in said member adjacent the bearing sleeve to form a lubricant chamber, a lubricant fitting carried by said member for directing lubricant into the chamber, said sleeve having an opening to admit lubricant from the chamber to the inner face of the sleeve.

RALPH KUSKIE.